United States Patent
Arakawa et al.

(10) Patent No.: US 9,256,437 B2
(45) Date of Patent: Feb. 9, 2016

(54) CODE GENERATION METHOD, AND INFORMATION PROCESSING APPARATUS

(71) Applicant: FUJITSU LIMITED, Kawasaki-shi, Kanagawa (JP)

(72) Inventors: Takashi Arakawa, Numazu (JP); Shuichi Chiba, Numazu (JP)

(73) Assignee: FUJITSU LIMITED, Kawasaki (JP)

( * ) Notice: Subject to any disclaimer, the term of this patent is extended or adjusted under 35 U.S.C. 154(b) by 174 days.

(21) Appl. No.: 13/783,906

(22) Filed: Mar. 4, 2013

(65) Prior Publication Data
US 2013/0262824 A1  Oct. 3, 2013

(30) Foreign Application Priority Data

Mar. 29, 2012 (JP) ................. 2012-076512

(51) Int. Cl.
*G06F 9/38* (2006.01)
*G06F 9/45* (2006.01)

(52) U.S. Cl.
CPC ............ *G06F 9/3851* (2013.01); *G06F 9/3887* (2013.01); *G06F 8/41* (2013.01)

(58) Field of Classification Search
None
See application file for complete search history.

(56) References Cited

U.S. PATENT DOCUMENTS

| | | | | |
|---|---|---|---|---|
| 2004/0098709 A1* | 5/2004 | Kyo | ........................ | G06F 8/447 717/140 |
| 2005/0289529 A1* | 12/2005 | Almog et al. | ................. | 717/158 |
| 2006/0195828 A1* | 8/2006 | Nishi et al. | ..................... | 717/140 |
| 2007/0033572 A1* | 2/2007 | Donovan | .................. | G06F 8/47 717/106 |
| 2007/0033592 A1* | 2/2007 | Roediger | .............. | G06F 9/5044 718/102 |
| 2010/0011339 A1* | 1/2010 | Eichenberger | .......... | G06F 8/456 717/106 |
| 2010/0205585 A1* | 8/2010 | McAllister | .............. | G06F 8/445 717/140 |
| 2012/0079469 A1* | 3/2012 | Gonion | ................... | G06F 8/456 717/160 |

FOREIGN PATENT DOCUMENTS

| | | |
|---|---|---|
| JP | 7-13963 | 1/1995 |
| JP | 2003-202991 | 7/2003 |

(Continued)

OTHER PUBLICATIONS

Chatterjee et al.Design and exploitation of a high-performance SIMD floating-point unit for Blue Gene/L. IBM Journal of Research and Development 49.2.3 (2005): 377-391. Retrieved on [Oct. 13, 2015] Retrieved from the Internet:URL<http://ieeexplore.ieee.org/stamp/stamp.jsp?tp=&arnumber=5388790>.*

(Continued)

*Primary Examiner* — Thuy Dao
*Assistant Examiner* — Cheneca Smith
(74) *Attorney, Agent, or Firm* — Staas & Halsey LLP

(57) ABSTRACT

A computer-readable recording medium having stored therein a program for causing a computer to execute a digital signature process includes determining that a first specific instruction for executing parallel calculations of the same type, each calculation operating on a different piece of data, is generated by combining first and second instructions included in a first code, retrieving, from the first code, a third instruction for calculating data referenced by the first instruction and a fourth instruction for calculating data referenced by the second instruction, and selecting the third and fourth instructions as candidates of instructions to be combined with each other preferentially to generate a second specific instruction which is different from the first specific instruction.

3 Claims, 16 Drawing Sheets

(56) References Cited

FOREIGN PATENT DOCUMENTS

JP          2011-165216        8/2011
WO      WO 2006/007193 A1    1/2006

OTHER PUBLICATIONS

Wu et al. "Efficient SIMD code generation for runtime alignment and length conversion." Code Generation and Optimization, 2005. CGO 2005. International Symposium on. IEEE, 2005, Retrieved on [Oct. 13, 2015] Retrieved from the Internet:URL<http://ieeexplore.ieee.org/stamp/stamp.jsp?tp=&arnumber=1402085>.*

Office Action issued by the Japanese Patent Office on Oct. 27, 2015 in corresponding Japanese patent application No. 2012-076512.

Tanaka et al., "A Code Generation Method for Processors with SIMD Instruction based on Operation Dependency and Distance", Information Processing Society of Japan, published Aug. 24, 2005, vol. 2005, No. 9, pp. 103-108, ISSN 1344-0640.

* cited by examiner (1)  A(I)    =  B(I)    +C(I);
(2)  A(I+1)  =  B(I+1)  +C(I+1);
(3)  D(I)    =  A(I+1)  +B(I);
(4)  D(I+1)  =  A(I)    +B(I+1);

$\begin{cases} A(I) = B(I) +C(I) \\ A(I+1) = B(I+1) +C(I+1) \end{cases}$ $\begin{cases} D(I) = A(I+1) +B(I) \\ D(I+1) = A(I) +B(I+1) \end{cases}$

OR $\begin{cases} A(I) = B(I) +C(I) \\ A(I+1) = B(I+1) +C(I+1) \end{cases}$ $\begin{cases} D(I+1) = A(I) +B(I+1) \\ D(I) = A(I+1) +B(I) \end{cases}$

FIG. 7A

| s1 | A(I) | A(I+1) | = | s2 | B(I) | B(I+1) | + | s3 | C(I) | C(I+1) |

| s4 | A(I+1) | A(I) | ← | s1 | A(I) | A(I+1) | (REGISTER TRANSFER)

| s5 | D(I) | D(I+1) | = | s4 | A(I+1) | A(I) | + | s2 | B(I) | B(I+1) |

FIG. 7B

| s1 | A(I) | A(I+1) | = | s2 | B(I) | B(I+1) | + | s3 | C(I) | C(I+1) |

| s4 | B(I+1) | B(I) | ← | s1 | B(I) | B(I+1) | (REGISTER TRANSFER)

| s5 | D(I+1) | D(I) | = | s1 | A(I) | A(I+1) | + | s4 | B(I+1) | B(I) |

| s1 | A(I) | C(I) | = | s2 | P(I) | T(I) | × | s3 | Q(I) | U(I) |

| s6 | E(I) | F(I) | = | s1 | A(I) | C(I) | − | s4 | V(I) | W(I) |

```
                ⋮                        141
1   LOAD    mem01      → R01
2   LOAD    mem02      → R02
3   MULT    R01 × R02  → R03
4   LOAD    mem03      → R04
5   ADD     R03 + R04  → R05
6   LOAD    mem04      → R06
7   LOAD    mem05      → R07
8   MULT    R06 × R07  → R08
9   LOAD    mem06      → R09
10  ADD     R08 + R09  → R10
11  ADD     R05 + R10  → R11
12  STORE   R11        → mem07
                ⋮
```

CODE GENERATION METHOD, AND INFORMATION PROCESSING APPARATUS

CROSS-REFERENCE TO RELATED APPLICATION

This application is based upon and claims the benefit of priority of the prior Japanese Patent Application No. 2012-76512, filed on Mar. 29, 2012, the entire contents of which are incorporated herein by reference.

FIELD

The embodiments discussed herein are related to a computer-readable recording medium, a code generation method, and an information processing apparatus.

BACKGROUND

Some processors such as CPUs (Central Processing Unit) are capable of executing the same type of calculation on different data in parallel by one instruction referred to as an "SIMD (Single Instruction Multiple Data) instruction". Such a processor which executes the SIMD instruction includes a register referred to as an "SIMD register" which stores different data to be processed in parallel in combination. It is assumed that data A1 and data A2 are stored in an SIMD register s1, data B1 and data B2 are stored in an SIMD register s2, and an SIMD instruction representing "s1+s2" is input to a processor. In this case, the processor performs two additions "A1+B1" and "A2+B2" in parallel by one instruction.

In general, as a method for generating a code including an SIMD instruction, two or more instructions which have the same calculation type and which may be executed in parallel are retrieved from among a plurality of instructions which are not SIMD instructions and the retrieved instructions are combined with each other to generate an SIMD instruction. For example, some compilers which convert source codes described by a high-level language into machine-readable object codes convert two or more instructions into an SIMD instruction by combining the two or more instructions in an optimization process. The number of instructions which can be combined with each other (parallel degree) depends on architecture of a processor.

Note that a program processing method for converting a source code into an intermediate code described by an RTL (Register Transfer Language), extracting an instruction set of different data in which the same calculation type is employed from the intermediate code, and converting the instruction set into an SIMD instruction has been proposed. Furthermore, a computer system which generates a trace dependency tree representing the dependency relationship among a plurality of instructions, retrieves two or more instructions which employ the same calculation type and which belong to the same level from the trace dependency tree, and merges the retrieved instructions into a single SIMD instruction has been proposed.

Japanese Laid-open Patent Publication No. 2003-202991 and International Publication Pamphlet No. WO 2006/007193 disclose related techniques.

SUMMARY

According to an aspect of the invention, a computer-readable recording medium having stored therein a program for causing a computer to execute a digital signature process includes determining that a first specific instruction for executing parallel calculations of the same type, each calculation operating on a different piece of data, is generated by combining first and second instructions included in a first code, retrieving, from the first code, a third instruction for calculating data referenced by the first instruction and a fourth instruction for calculating data referenced by the second instruction, and selecting the third and fourth instructions as candidates of instructions to be combined with each other preferentially to generate a second specific instruction which is different from the first specific instruction.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIGS. 7A and 7B are diagrams illustrating transfer instructions and critical paths;

FIG. 8 is a diagram illustrating a source code;

FIG. 11 is a diagram illustrating other assignment of the SIMD registers;

FIG. 13 is a diagram illustrating an intermediate code;

DESCRIPTION OF EMBODIMENTS

First, the inventor considers related techniques.

As a method for determining a combination of instructions, a method for scanning an instruction queue included in an original code from the beginning to the end so that combinations of instructions are preferentially determined from the beginning of the instruction queue may be employed. However, in the method for determining combinations from the beginning of the instruction queue, data transfer occurs between SIMD registers, and accordingly, execution efficiency of a code including an SIMD instruction may be lowered.

It is assumed that a first instruction "A1=B1+C1", a second instruction "A2=B2+C2", a third instruction "A3=B3+C3", a fourth instruction "D1=A2×E1", and a fifth instruction "D2=A3×E2" are issued and a parallel degree of SIMD is 2. In this case, when combinations are successively determined from the beginning of an instruction queue, for example, a first SIMD instruction is generated from the first and second instructions and a second SIMD instruction is generated from the fourth and fifth instructions. However, the data A1 and the data A2 are stored in the same SIMD register when the first SIMD instruction is executed, and meanwhile, the data A2 and the data A3 are to be stored in the same SIMD register when the second SIMD instruction is executed. Therefore, with these combinations, a transfer instruction for transferring data between SIMD registers is inserted between the first SIMD instruction and the second SIMD instruction. The larger the number of inserted transfer instructions is, the lower execution efficiency of a generated code is.

Hereinafter, embodiments will be described with reference to the accompanying drawings.

First Embodiment

Figure 1:
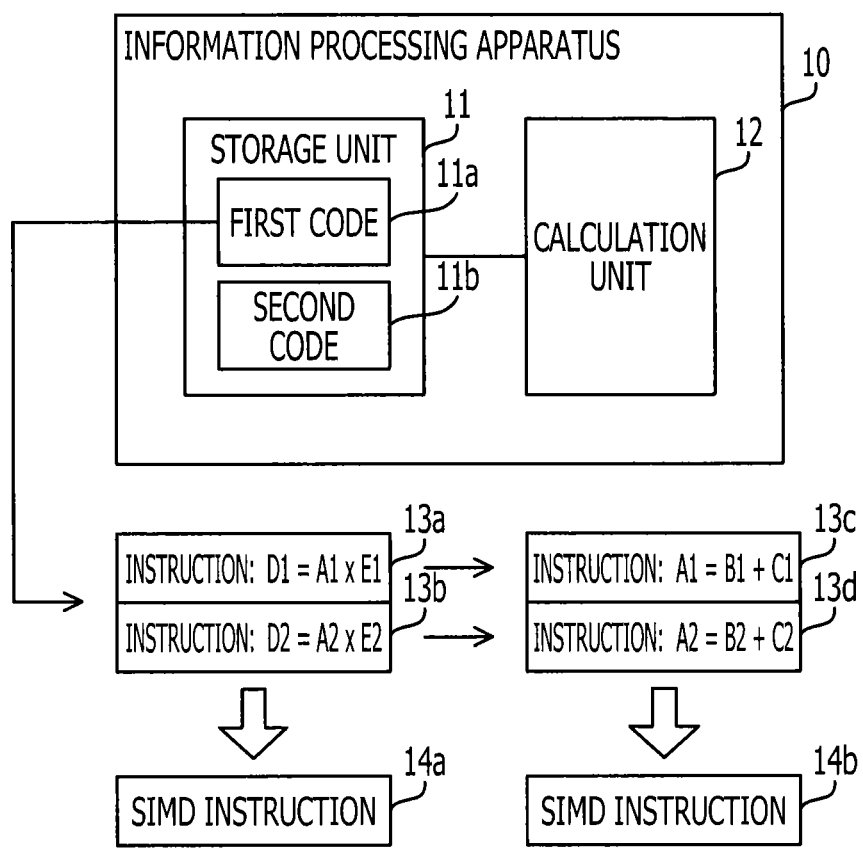
FIG. 1 is a diagram illustrating an information processing apparatus according to a first embodiment.

FIG. 1 is a diagram illustrating an information processing apparatus according to a first embodiment. An information processing apparatus 10 generates, from a first code 11a, a second code 11b including an SIMD instruction. The first code 11a is a source code described by a high-level language or an intermediate code converted from a source code, for example. The second code 11b is an object code or an execution code which can be interpreted by the information processing apparatus 10 or a processor of another computer. The information processing apparatus 10 may be a client computer serving as a terminal device operated by a user or a server computer accessed by the terminal device. Note that the SIMD instruction is an example of a specific instruction for executing calculations of the same type on different data in parallel.

The information processing apparatus 10 includes a storage unit 11 and a calculation unit 12. The storage unit 11 stores the first and second codes 11a and 11b. The storage unit 11 may be a volatile storage device such as a RAM (Random Access Memory) or a nonvolatile storage device such as an HDD (Hard Disk Drive) or a flash memory. The calculation unit 12 combines two or more instructions included in the first code 11a so as to generate an SIMD instruction, that is, generate the second code 11b. The calculation unit 12 may be a processor, such as a CPU or a DSP (Digital Signal Processor), or an electronic circuit other than a processor, such as an ASIC (Application Specific Integrated Circuit) or an FPGA (Field Programmable Gate Array). The processor executes programs stored in the storage unit 11 or other memories, for example.

When detecting instructions 13a and 13b which correspond to the same calculation type and which do not have a dependency relationship from the first code 11a, the calculation unit 12 determines that an SIMD instruction 14a is to be generated by combining the instructions 13a and 13b. The dependency relationship includes a definition and a reference relationship in which one of instructions refers to data calculated by the other of the instructions. A combination of the instructions 13a and 13b is detected by scanning an instruction queue of the first code 11a from the end to the beginning so that combinations are preferentially obtained from the end.

Subsequently, the calculation unit 12 retrieves, from the first code 11a, an instruction 13c which calculates data which is reference by the instruction 13a and an instruction 13d which calculates data which is referenced by the instruction 13b. It is assumed that the instruction 13a is represented by "D1=A1×E1" and the instruction 13b is represented by "D2=A2×E2". In this case, the calculation unit 12 retrieves "A1=B1+C1" as the instruction 13c for calculating the data A1 and "A2=B2+C2" as the instruction 13d for calculating the data A2. It is expected that, in the first code 11a, the instruction 13c is positioned before the instruction 13a and the instruction 13d is positioned before the instruction 13b.

Then the calculation unit 12 preferentially selects the instructions 13c and 13d over other instructions as candidates of instructions to be combined with each other so that an SIMD instruction 14b which is different from the SIMD instruction 14a is generated. Then the calculation unit 12 determines whether the selected instructions 13c and 13d satisfy a given condition, so as to finally determine whether the SIMD instruction 14b is to be generated from the instructions 13c and 13d. For example, the calculation unit 12 determines that the instructions 13c and 13d are not combined with each other when calculation types of the instructions 13c and 13d are different from each other or the instructions 13c and 13d have the dependency relationship. Furthermore, for example, the calculation unit 12 determines whether a transfer instruction is to be generated when the instructions 13c and 13d are combined with each other by comparing data which is referenced by an instruction which has been determined to be combined with another instruction with data which is referenced by the instructions 13c and 13d. When the transfer instruction is to be generated, the calculation unit 12 may determine that the instructions 13c and 13d are not combined with each other.

Note that, in the example described above, as for a combination of the data E1 which is referenced by the instruction 13a and the data E2 which is referenced by the instruction 13b, candidates of instructions to be combined with each other can be retrieved. Furthermore, when it is determined that the instructions 13c and 13d are combined with each other, the calculation unit 12 can sequentially retrieve candidates of combinations of other instructions in accordance with the combinations of data which is referenced by the instructions 13c and 13d (for example, a combination of the data B1 and the data B2 and a combination of the data C1 and the data C2).

According to the information processing apparatus 10 of the first embodiment, using data which is referenced by instructions which have determined to be combined with each other as a key, the dependency relationship between instructions are traced from the end to the beginning so that candidates of instructions to be combined with each other next are retrieved. By this, a combination of instructions which can suppress data transfer between SIMD registers can be retrieved, and execution efficiency of the second code 11b generated by the information processing apparatus 10 is improved.

Second Embodiment

Figure 2:
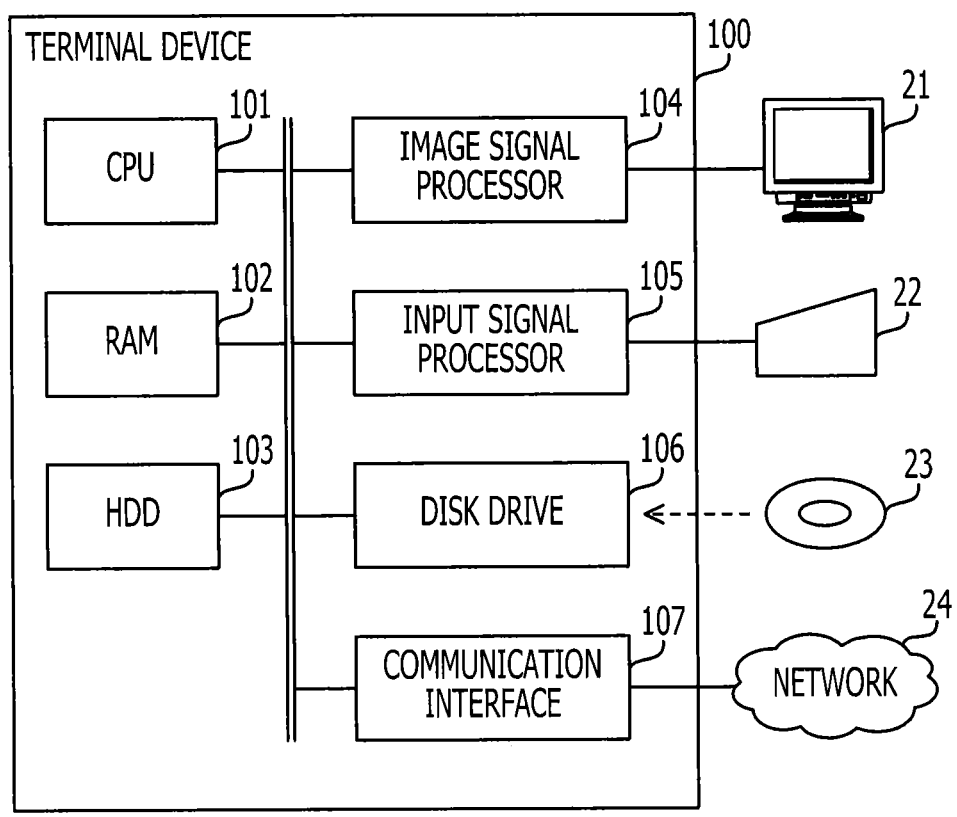
FIG. 2 is a diagram illustrating hardware of a terminal device.

FIG. 2 is a diagram illustrating hardware of a terminal device. A terminal device 100 of a second embodiment compiles source codes described by a high-level language so as to generate machine-readable object codes and links a plurality of object codes to one another so as to generate an execution code to be executed by the terminal device 100 or another computer. Note that the compiling and the link described in the second embodiment may be executed by a server computer.

The terminal device 100 includes a CPU 101, a RAM 102, an HDD 103, an image signal processor 104, an input signal processor 105, a disk drive 106, and a communication interface 107. The CPU 101 is an example of the calculation unit 12 of the first embodiment and the RAM 102 and the HDD 103 are examples of the storage unit 11 of the first embodiment.

The CPU 101 is a processor including a calculator which executes instructions of programs. The CPU 101 loads at least a number of programs and data stored in the HDD 103 into the RAM 102 and executes the programs. Note that the CPU 101 may include a plurality of processor cores. The terminal device 100 may include a plurality of processors. Processes described below may be executed in parallel using the plurality of processors or the plurality of processor cores.

The RAM 102 is a volatile memory which temporarily stores programs to be executed by the CPU 101 and data used for calculations. Note that the terminal device 100 may include a memory other than a RAM and may include a plurality of memories.

The HDD 103 is a nonvolatile storage device which stores programs of an OS (Operating System), firmware, and software such as application software and stores data. Note that the terminal device 100 may include other types of storage devices such as a flash memory and an SSD (Solid State Drive) and may include a plurality of storage devices.

The image signal processor 104 outputs images to a display 21 coupled to the terminal device 100 in accordance with an instruction issued by the CPU 101. As the display 21, a CRT (Cathode Ray Tube) display or a liquid crystal display may be used.

The input signal processor 105 obtains an input signal from an input device 22 coupled to the terminal device 100 and transmits the input signal to the CPU 101. Examples of the input device 22 include a pointing device such as a mouse or a touch panel and a keyboard.

The disk drive 106 is a drive device which reads programs and data recorded in a recording medium 23. Examples of the recording medium 23 include a magnetic disk such as a flexible disk (FD) or an HDD, an optical disc such as a CD (Compact Disc) or a DVD (Digital Versatile Disc), and a magneto-optical disk (MO). The disk drive 106 stores programs and data read from the recording medium 23 in the RAM 102 or the HDD 103 in accordance with an instruction issued by the CPU 101, for example.

The communication interface 107 is used for communication with another computer through a network 24. The communication interface 107 may be a wired interface coupled to a wired network or a wireless interface coupled to a wireless network.

Figure 3:
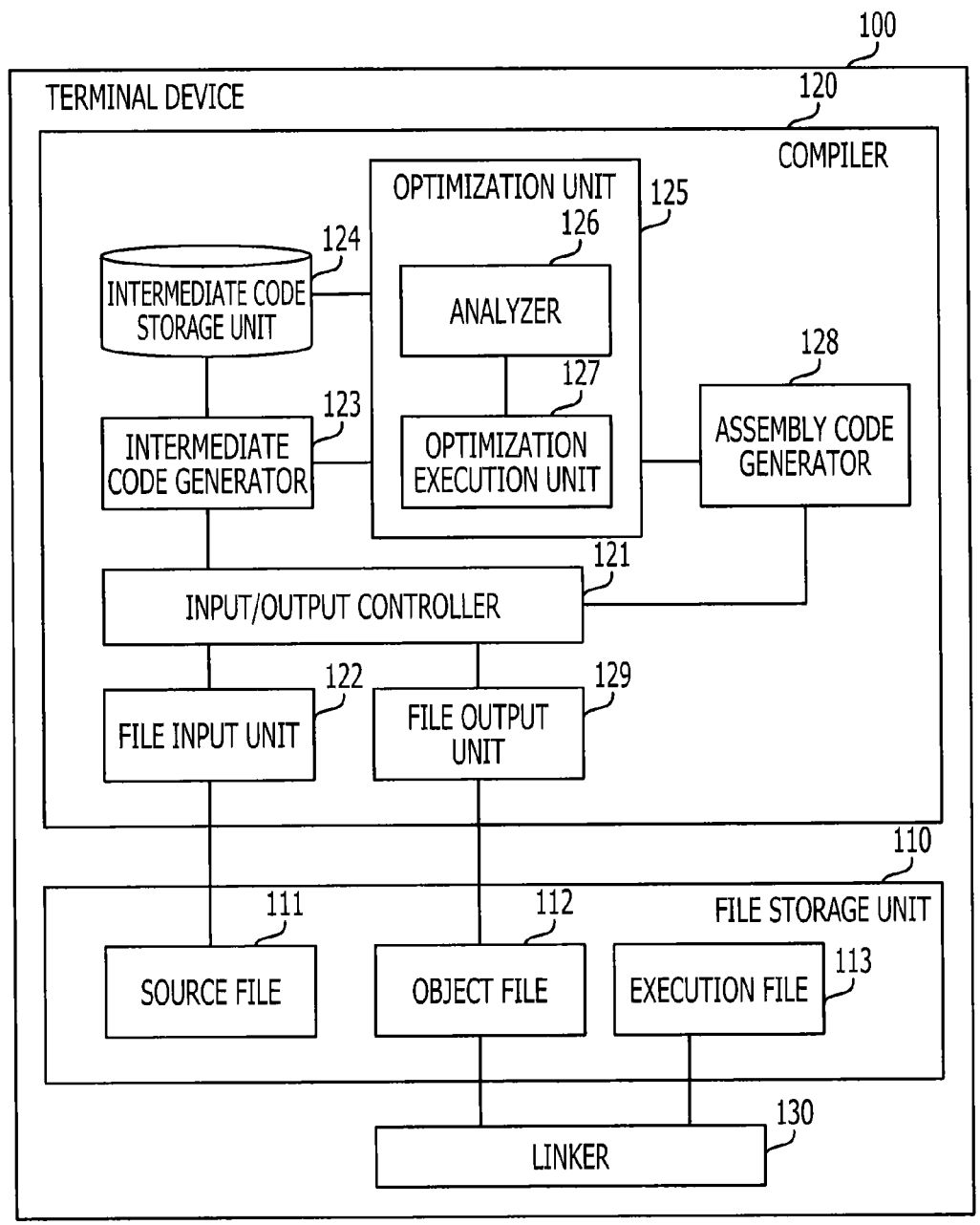
FIG. 3 is a diagram illustrating software of the terminal device.

FIG. 3 is a block diagram illustrating software of the terminal device. The terminal device 100 includes a file storage unit 110, a compiler 120, and a linker 130. The file storage unit 110 is realized as a storage region ensured in the RAM 102 or the HDD 103. The compiler 120 and the linker 130 may be realized as program modules executed by the CPU 101. Note that a number of functions or all functions of the compiler 120 and the linker 130 may be realized as an electronic circuit instead of software.

The file storage unit 110 stores a source file 111, an object file 112, and an execution file 113. The source file 111 includes source codes described by a high-level language. The object file 112 includes machine-readable object codes including SIMD instructions. The execution file 113 has a format which is executable by a processor which has certain architecture and which can interpret SIMD instructions. Note that the CPU 101 may be capable of executing the execution file 113 or may not be capable of executing the execution file 113.

The compiler 120 reads the source file 111 from the file storage unit 110, converts a source code into an object code, and stores the object file 112 in the file storage unit 110. The compiler 120 includes an input/output controller 121, a file input unit 122, an intermediate code generator 123, an intermediate code storage unit 124, an optimization unit 125, an assembly code generator 128, and a file output unit 129.

The input/output controller 121 selects an input/output method in accordance with a type of file and controls the file input unit 122 and the file output unit 129. The file input unit 122 opens the source file 111 in accordance with an instruction issued by the input/output controller 121 and reads a source code from the source file 111. The intermediate code generator 123 analyzes the source code read by the file input unit 122, converts the source code into an intermediate code described by an intermediate language internally used in the compiler 120, and stores the intermediate code in the intermediate code storage unit 124. The analysis of the source code includes lexical analysis, syntax analysis, and semantic analysis. The intermediate code storage unit 124 is a storage region ensured in the RAM 102 and stores the intermediate code.

The optimization unit 125 optimizes the intermediate code stored in the intermediate code storage unit 124 so that execution speed is improved. The optimization unit 125 includes an analyzer 126 and an optimization execution unit 127. The analyzer 126 determines an optimization method by analyzing the intermediate code. The determination of the optimization method performed by the analyzer 126 includes a determination of a combination of instructions to be converted into an SIMD instruction among instructions included in the intermediate code. The optimization execution unit 127 optimizes the intermediate code in accordance with the optimization method determined by the analyzer 126. The optimization performed by the optimization execution unit 127 includes conversion of instructions included in the intermediate code into an SIMD instruction.

The assembly code generator 128 converts the optimized intermediate code into an assembly code described by an assembly language which is a low-level language. The file output unit 129 generates the object file 112 in accordance with an instruction issued by the input/output controller 121. Then the file output unit 129 converts the assembly code generated by the assembly code generator 128 into an object code and writes the object code in the object file 112.

The linker 130 reads the object file 112 from the file storage unit 110 and analyzes the object code so as to detect other referenced object files and referenced libraries. Then the linker 130 links the object file 112 to the detected other object files and the libraries so as to generate the execution file 113. Note that functions of the linker 130 may be integrally included in the compiler 120.

Here, a method for executing an SIMD instruction in a processor will be described.

Figure 4:
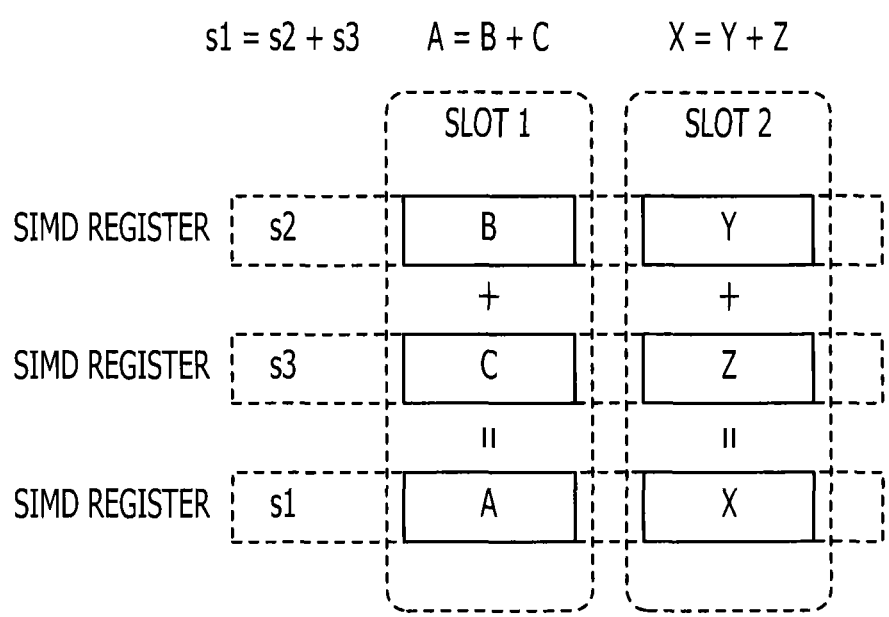
FIG. 4 is a diagram illustrating the relationships between SIMD instructions and SIMD registers.

FIG. 4 is a diagram illustrating the relationships between SIMD instructions and SIMD registers. A processor capable of interpreting an SIMD instruction includes SIMD registers which store different data to be processed in parallel in combination. Each of the SIMD registers includes a number of sub-registers corresponding to a parallel degree determined by architecture of the processor. In a case of FIG. 4, the parallel degree is 2.

As illustrated in FIG. 4, a case where two instructions "A=B+C" and "X=Y+Z" are converted into a single SIMD instruction "s1=s2+s3" is taken as an example. In this case, the data B is stored in a first sub-register of an SIMD register s2, the data Y is stored in a second sub-register of the SIMD register s2, the data C is stored in a first sub-register of a SIMD register s3, and the data Z is stored in a second sub-register of the SIMD register s3. Then, two additions are executed in parallel in accordance with an SIMD instruction so that the data A and the data X are obtained. The data A is stored in a first sub-register of a SIMD register s1 and the data X is stored in a second sub-register of the SIMD register s1.

Here, a group of sub-registers in the same position is referred to as a "slot". For example, the first sub-registers of the SIMD registers s1, s2, and s3 belong to a first slot and the second sub-registers of the SIMD registers s1, s2, and s3 belong to a second slot. In an SIMD instruction, a single calculation is performed using a plurality of sub-registers which belong to the same slot.

Figure 5A:
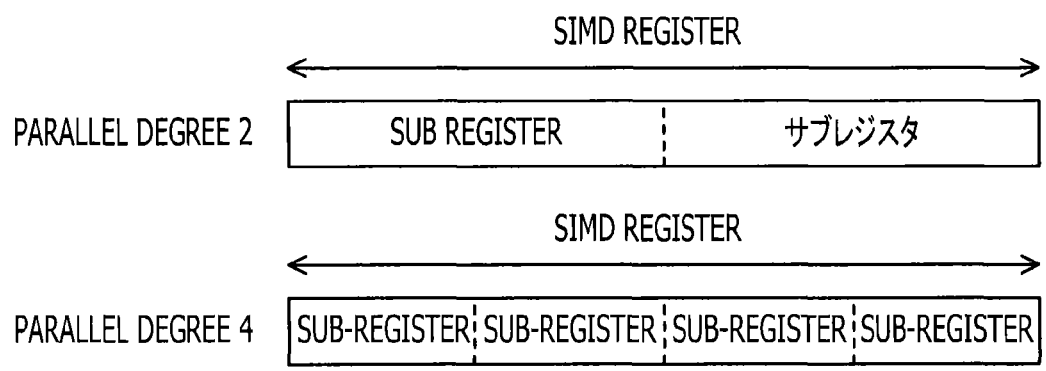
FIGS. 5A and 5B are diagrams illustrating implementation of SIMD registers.
Figure 5B:
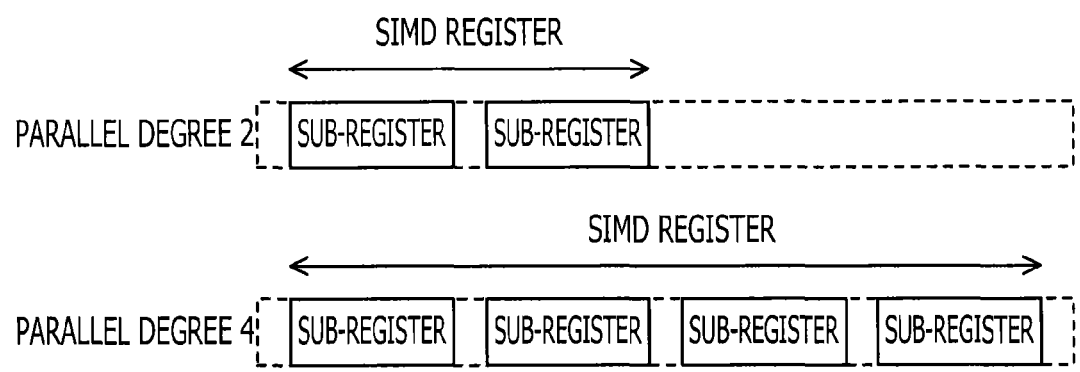

FIGS. 5A and 5B are diagrams illustrating implementation of SIMD registers. Examples of a method for implementing an SIMD register in a processor include a division method illustrated in FIG. 5A and a coupling method illustrated in FIG. 5B.

In the division method, a single large physical register is divided into a plurality of sub-registers which have logically the same size. When the parallel degree is 2, a storage region of the physical register is divided into two. When the parallel degree is 4, the storage region of the physical register is divided into four. Assuming that a size of the physical register is invariable, the larger the parallel degree is, the smaller the number of bits of each of the sub-registers is. In the division method, an SIMD register represents a physical register and a sub-register represents a logical register.

On the other hand, in the coupling method, an SIMD register is generated such that a plurality of physical registers which have the same number of bits are grouped and each of the physical registers is used as a sub-register. When the parallel degree is 2, a group of two physical registers serves as an SIMD register. When the parallel degree is 4, a group of four physical registers serves as an SIMD register. Assuming that a size of the physical register is invariable, the larger the parallel degree is, the larger the number of bits of the SIMD-register is. In the division method, an SIMD register represents a logical register and a sub-register represents a physical register.

Next, a problem in which a transfer instruction is inserted between SIMD instructions will be described.

Figure 6:
FIG. 6 is a diagram illustrating conversion of instructions into SIMD.

FIG. 6 is a diagram illustrating conversion of instructions into SIMD. Here, optimization of the following four instructions is taken as an example: First Instruction; A(I)=B(I)+C(I), Second Instruction; A(I+1)=B(I+1)+C(I+1), Third Instruction; D(I)=A(I+1)+B(I), Fourth Instruction; D(I+1)=A(I)+B(I+1). The third instruction refers to a calculation result of the second instruction and the fourth instruction refers to a calculation result of the first instruction. For example, the third instruction depends on the second instruction and the fourth instruction depends on the first instruction.

When a parallel degree of an SIMD is 2, it is assumed that the optimization unit 125 converts a group of the first and second instructions into a first SIMD instruction and a group of the third and fourth instructions into a second SIMD instruction. In this case, two types of method for assigning slots to the instructions may be employed. (A) The third instruction is assigned to a slot to which the first instruction is assigned (first slot) and the fourth instruction is assigned to a slot to which the second instruction is assigned (second slot). Alternatively, (B) the fourth and first instructions are assigned to the same slot (first slot) and the third and second instructions are assigned to the same slot (second slot).

FIGS. 7A and 7B are diagrams illustrating transfer instructions and critical paths.

In a case where the assigning method (A) described above is employed, when the first SIMD instruction is executed, the data A(I) is stored in a sub-register of the first slot and the data A(I+1) is stored in a sub-register of the second slot. Meanwhile, to execute the second SIMD instruction, the data A(I+1) is stored in the sub-register of the first slot and the data A(I) is stored in the sub-register of the second slot. Therefore, between the first and second SIMD instructions, a transfer instruction for transferring the data A(I) and data A(I+1) calculated in the first SIMD instruction is inserted.

On the other hand, when the assigning method (B) described above is employed, the data A(I) and the data A(I+1) are not transferred. However, to execute the second SIMD instruction, the data B(I+1) is stored in the sub-register of the first slot and the data B(I) is stored in the sub-register of the second slot. Therefore, between the first and second SIMD instructions, a transfer instruction for transferring the data B(I) and the data B(I+1) referenced by the first SIMD instruction is inserted.

As described above, a transfer instruction is inserted between the first and second SIMD instructions when either one of the assigning methods (A) and (B) is employed. However, in the case of the assigning method (A), the second SIMD instruction waits execution of the transfer instruction and the transfer instruction waits execution of the first SIMD instruction. On the other hand, in the case of the assigning method (B), although the second SIMD instruction waits execution of the first SIMD instruction and execution of the transfer instruction, the transfer instruction does not wait completion of the execution of the first SIMD instruction. For example, it is highly likely that the assigning method (A) has a longer critical path (the longest path in which instructions having the dependency relationship are arranged in series) and has more strict constraint of order of execution of instructions, and has low execution efficiency.

As described above, a transfer instruction may be inserted between SIMD instructions depending on combinations of instructions to be converted into the SIMD instructions. Furthermore, the inserted transfer instruction affects a critical path depending on assignment of instructions to slots.

Next, a problem which arises when a combination of instructions to be converted into SIMD is retrieved will be described.

FIG. 8 is a diagram illustrating a source code. It is assumed here that eight instructions are included in the source file 111 as illustrated in FIG. 8. First, second, third, and eighth instructions correspond to multiplication (×), a sixth instruction corresponds to division (÷), and fourth, fifth, and seventh instructions correspond to subtraction (−). The fourth instruction refers to data calculated by the first and second instructions, and the fifth instruction refers to data calculated by the first instruction. The sixth instruction refers to data calculated by the fourth and fifth instructions, the seventh instruction refers to data calculated by the third instruction, and the eighth instruction refers to data calculated by the sixth and seventh instructions.

Figure 9:
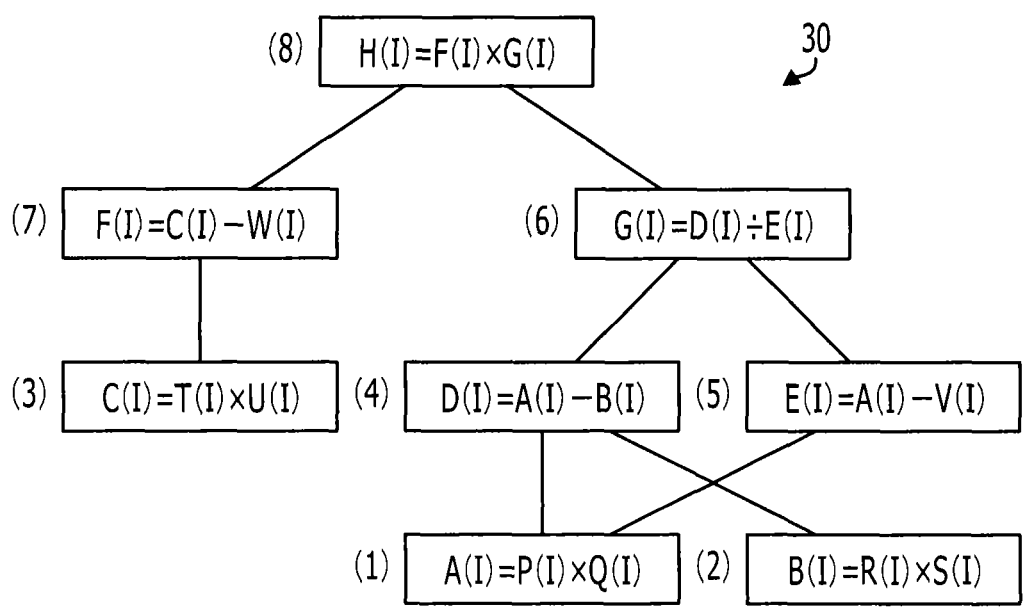
FIG. 9 is a diagram illustrating an instruction dependency graph.

FIG. 9 is a diagram illustrating an instruction dependency graph. At least one instruction dependency graph representing the dependency relationship among instructions can be generated for each code range (translation unit) simultaneously processed by the compiler 120. An instruction dependency graph 30 illustrated in FIG. 9 correspond to the first to eighth instructions illustrated in FIG. 8. As described above, the fourth instruction depends on the first and second instructions, the fifth instruction depends on the first instruction, the seventh instruction depends on the third instruction, the sixth instruction depends on the fourth and fifth instructions, and the eighth instruction depends on the sixth and seventh instructions. Note that, although an optimization process is performed on an intermediate code converted from the source code, the instructions are described by a format of a high-level language for easy understanding in FIG. 9.

A case where a parallel degree of SIMD is 2 and at least one combination of instructions is selected from the first to eighth instructions so as to be converted into an SIMD instruction is taken as an example. When a combination of instructions to be converted into SIMD is retrieved from the beginning to the end of the intermediate code (for example, in a direction from leaf nodes to a root node of the instruction dependency graph 30), a combination of the first and second instructions is first selected.

Figure 10A:
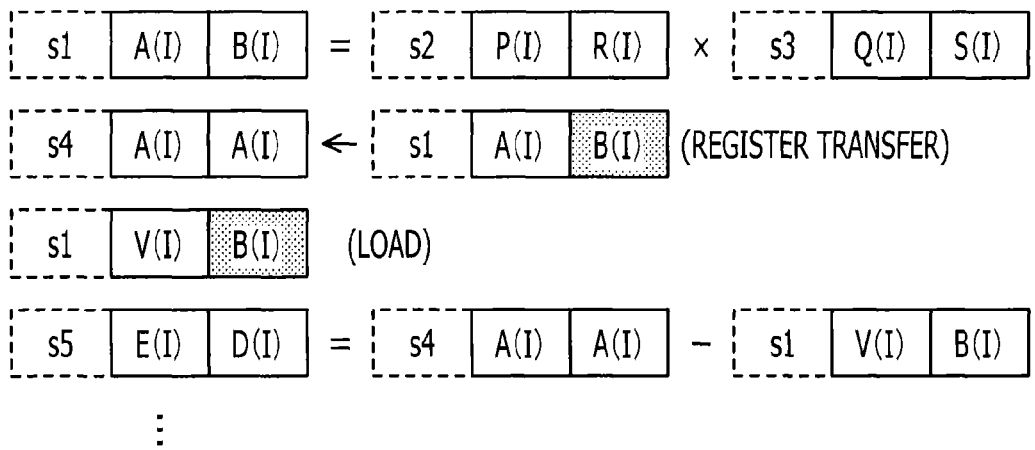
FIGS. 10A, 10B, and 10C are diagrams illustrating assignment of SIMD registers.
Figure 10B:
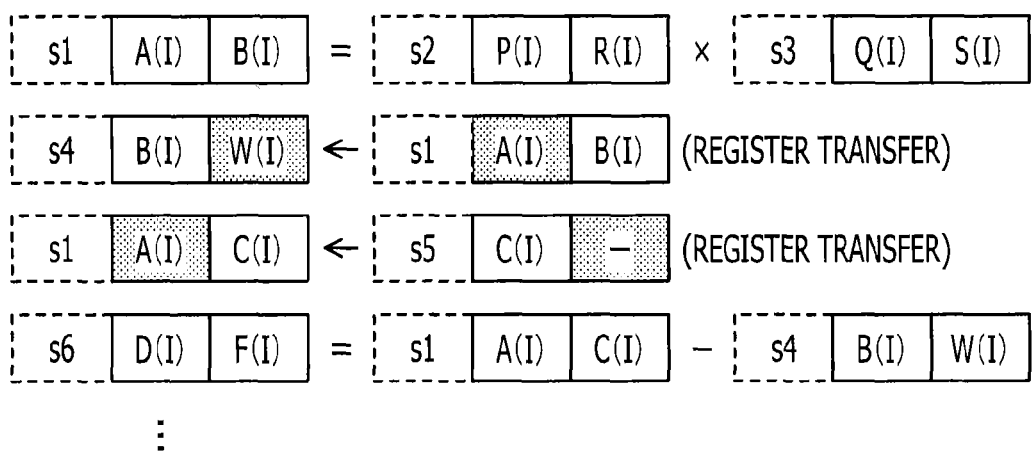
Figure 10C:
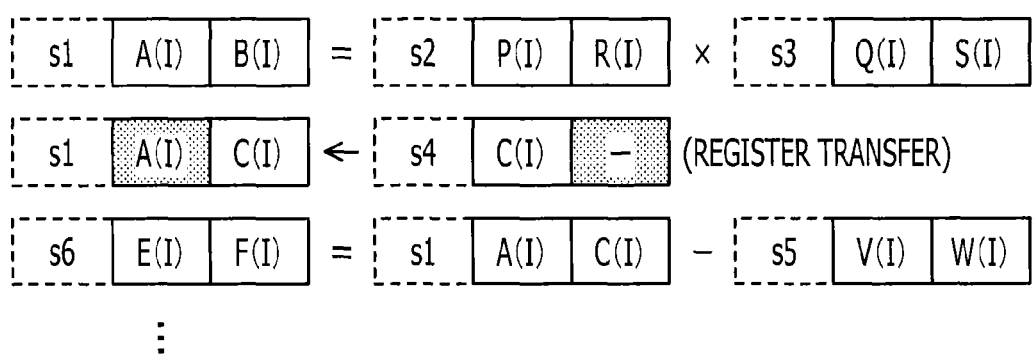

FIGS. 10A, 10B, and 10C are diagrams illustrating assignment of SIMD registers. FIG. 10A is a diagram illustrating a case where the combination of the first and second instructions and a combination of the fourth and fifth instructions are individually converted into SIMD. FIG. 10B is a diagram illustrating a case where the combination of the first and second instructions and a combination of the fourth and seventh instructions are individually converted into SIMD. FIG. 10C is a diagram illustrating a case where the combination of the first and second instructions and a combination of the fifth and seventh instructions are individually converted into SIMD.

When the fourth and fifth instructions are converted into SIMD after the first and second instructions are converted into SIMD, a combination of the data A(I) and the data B(I) calculated by the combination of the first and second instructions and a combination of the data A(I) and the data A(I) which is referenced by the combination of the fourth and the fifth instructions do not match each other, and therefore, a transfer instruction is inserted. Similarly, when the fourth and seventh instructions are converted into SIMD after the first and second instructions are converted into SIMD, a combination of the data A(I) and the data B(I) calculated by the combination of the first and second instructions and a combination of the data A(I) and the data C(I) which are referenced by the combination of the fourth and the seventh instructions do not match each other, and therefore, transfer instructions are inserted. Furthermore, when the fifth and seventh instructions are converted into SIMD after the first and second instructions are converted into SIMD, a combination of the data A(I) and the data B(I) calculated by the combination of the first and second instructions and a combination of the data A(I) and the data C(I) which are referred by the combination of the fifth and the seventh instructions do not match each other, and therefore, a transfer instruction is inserted.

As described above, in a case of an instruction queue illustrated in FIGS. 8 and 9, when the combination of the first and second instructions is determined by retrieving instruction combinations from the intermediate code from the beginning to the end of the intermediate code, execution efficiency of an object code generated by the compiler 120 is not improved.

FIG. 11 is a diagram illustrating other assignment of the SIMD registers. The example of the assignment of FIG. 11 illustrates a case where a combination of the first and third instructions and a combination of the fifth and seventh instructions are individually converted into SIMD. When the first and third instructions and the fourth and fifth instructions are converted into SIMD, a combination of the data A(I) and the data C(I) calculated by the combination of the first and third instructions and a combination of the data A(I) and the data C(I) which are referenced by the combination of the fifth and the seventh instructions match each other, and therefore, a transfer instruction is not inserted between the two SIMD instructions. Therefore, a combination pattern of instructions illustrated in FIG. 11 has higher execution efficiency than the patterns illustrated in FIGS. 10A, 10B, and 10C, which is preferable. However, by a method for retrieving instruction combinations from the beginning to the end of the intermediate code and converting the instruction combinations which can be converted into SIMD into SIMD as soon as retrieved, the combination pattern illustrated in FIG. 11 is not detected.

Here, a method for retrieving optimum combinations by checking all combinations of instructions within a certain range of the intermediate code may be employed. However, the method for perform searching on all instruction combinations is inefficient since the number of calculations is increased. Assuming that N instructions correspond to the same calculation type and a parallel degree of SIMD is 2, $2^{N/2} \times (N-1)!!$ patterns of instruction combinations are obtained (here, "!!" represents double factorial). Therefore, when a retrieval range is large, it becomes difficult to calculate an optimum combination pattern by performing searching on all instruction combinations.

Accordingly, the optimization unit 125 retrieves instruction combinations by a method described below.

Figure 12:
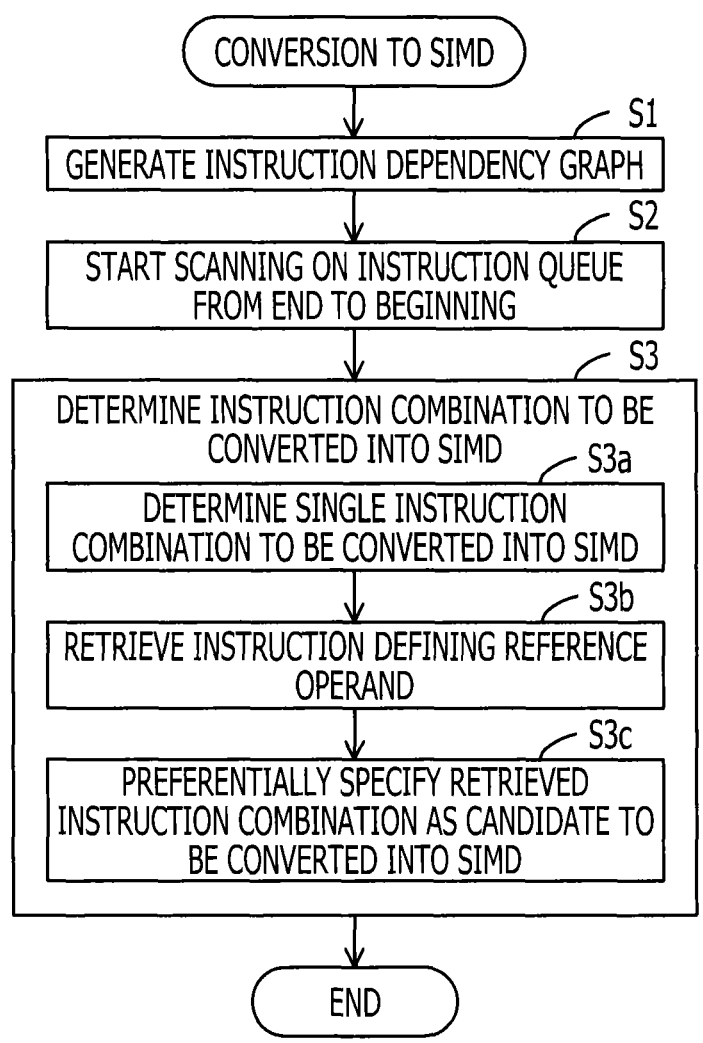
FIG. 12 is a flowchart illustrating a procedure of an SIMD process.

FIG. 12 is a flowchart illustrating a procedure of an SIMD process.

(Operation S1) The analyzer 126 reads an intermediate code in a translation unit from the intermediate code storage unit 124 and analyzes the dependency relationship among instructions included in the read intermediate code. For example, the analyzer 126 analyzes the dependency relationship by scanning an instruction queue from the end to the beginning. Then the analyzer 126 generates an instruction dependency graph representing the dependency relationship.

(Operation S2) The analyzer 126 starts scanning of the instruction queue from the end to the beginning of the instruction queue so as to retrieve instruction combinations which can be converted into SIMD. As a method for scanning an instruction queue, a method for successively scanning the instructions of the intermediate code may be employed, or a method for scanning nodes from a root node to leaf nodes of the instruction dependency graph generated in Operation S1 may be employed.

(Operation S3) The analyzer 126 successively determines instruction combinations which are to be converted into SIMD by the scanning of the instruction queue started in Operation S2. Here, the analyzer 126 selects a candidate of an instruction combination which is to be converted into SIMD next in accordance with an instruction combination which has been determined to be converted into SIMD. The operation of Operation S3 includes operations of Operation S3a, Operation S3b, and Operation S3c below.

(Operation S3a) The analyzer 126 determines a combination of instructions to be converted into SIMD. After scanning is started from the end of the instruction queue, two or more instructions which correspond to the same calculation type and which do not have the dependency relationship are preferentially detected from the end of the instruction queue, for example, and the detected two or more instructions are combined with each other.

(Operation S3b) The analyzer 126 extracts registers (reference operands) which are referenced by the instructions which are determined to be converted into SIMD in Operation S3a. Then the analyzer 126 retrieves, from the instruction queue, other instructions having calculation results stored in registers (definition operands) which are the same as the reference operands for individual extracted reference operands. For example, the analyzer 126 retrieves, from the instruction queue, other instructions on which the instructions which have been determined to be converted into SIMD depend.

(Operation S3c) The analyzer 126 determines whether two or more other instructions which correspond to the two or more instructions which have been determined to be converted into SIMD and which are retrieved in Operation S3b have the same calculation type and do not have the dependency relationship with each other (that is, whether the two or more other instructions can be converted into SIMD). When these conditions are satisfied, the analyzer 126 preferentially selects the retrieved two or more other instructions as a candidate of an instruction combination to be converted into SIMD next. In this case, when each of the instructions determined to be converted into SIMD includes two or more reference operands, two or more candidates of instruction combinations to be converted into SIMD may be selected.

The analyzer 126 repeatedly performs the operations of Operation S3a, Operation S3b, and Operation S3c until other instructions are not retrieved in Operation S3b. When other instructions are not retrieved in Operation S3b, the analyzer 126 searches for an instruction combination to be converted into SIMD next in accordance with the method in Operation S2. The process described above is repeatedly performed until the scanning to the beginning of the instruction queue is completed. For example, in the example of the instruction queue illustrated in FIGS. 8 and 9, the analyzer 126 performs scanning from the eighth instruction to the first instruction, and converts a combination of the fifth and seventh instructions into SIMD first. Thereafter, the analyzer 126 converts a combination of the first instruction which defines the data A(I) referenced by the fifth instruction and the third instruction which defines the data C(I) referenced by the seventh instruction into SIMD.

Note that, when a determination as to whether a candidate of an instruction combination selected in Operation S3c is made in Operation S3a, the analyzer 126 compares reference operands of the candidate of the instruction combination with reference operands of an instruction combination which has been determined to be converted into SIMD. Then the analyzer 126 determines whether a transfer instruction is to be generated in accordance with a combination of the reference operands. When a transfer instruction is to be generated, the candidate of the instruction combination is not employed (not converted into SIMD).

For example, the analyzer 126 determines that a transfer instruction is to be generated when the following two conditions are satisfied. (1) The reference operands included in the instructions of the candidates to be converted into SIMD are included in instructions which have been converted into SIMD. (2) A combination of the reference operands of the candidate of the instruction combination is different from a combination of the reference operands of the instruction combination which has been determined to be converted into SIMD or a method for assigning the reference operands of the candidate of the instruction combination to a slot is different from a method for assigning the reference operands of the instruction combination which has been determined to be converted into SIMD to a slot.

Hereinafter, an example of implementation of the operation performed in Operation S3 will be described.

FIG. 13 is a diagram illustrating an intermediate code. An intermediate code 141 is stored in the intermediate code storage unit 124. A certain translation unit of the intermediate code 141 includes first to twelfth instructions. The first, second, fourth, sixth, seventh, and ninth instructions are LOAD instructions for reading data from the RAM 102 and the twelfth instruction is a STORE instruction for writing data in the RAM 102. The third and eighth instructions are MULT (multiplication) instructions and the fifth, tenth, and eleventh instructions are ADD (addition) instructions.

The third instruction depends on the first and second instructions, the fifth instruction depends on the third and fourth instructions, the eighth instruction depends on the sixth and seventh instructions, the tenth instruction depends on the eighth and ninth instructions, the eleventh instruction depends on the fifth and tenth instructions, and the twelfth instruction depends on the eleventh instruction. From the first to twelfth instructions described above, a single instruction dependency graph is generated. Note that "R01", "R02", "R03", "R04", "R05", "R06", "R07", "R08", "R09", "R10", and "R11" illustrated in FIG. 13 represent logical registers.

Figure 14:
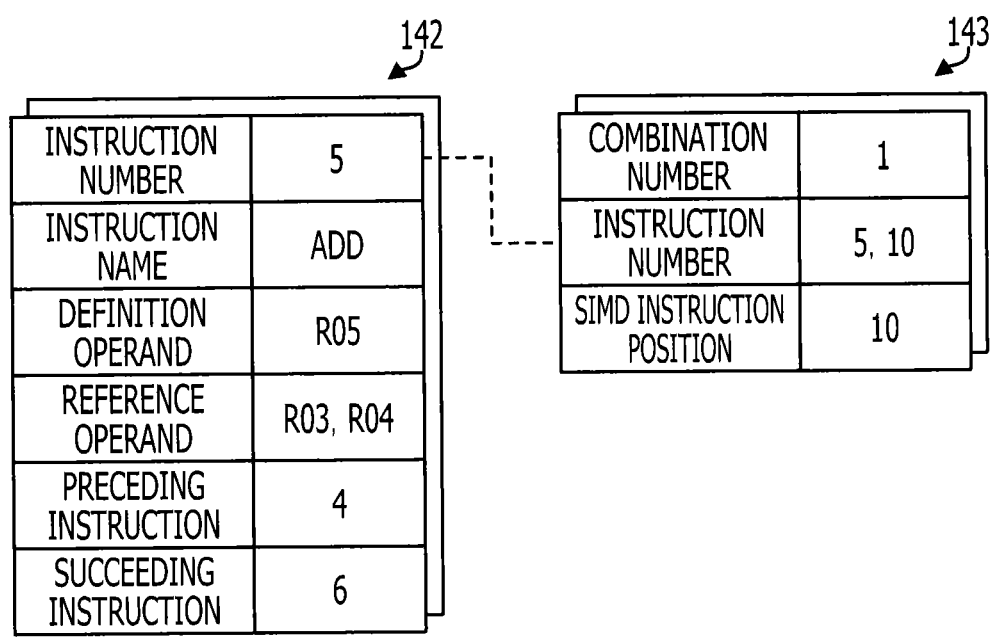
FIG. 14 is a diagram illustrating instruction data and instruction combination data.

FIG. 14 is a diagram illustrating instruction data and instruction combination data. The analyzer 126 generates instruction data 142 in Operation 51 described above. Furthermore, when determining an instruction combination to be converted into SIMD in Operation S3 above, the analyzer 126 generates instruction combination data 143.

The instruction data 142 includes items of an instruction number, an instruction name, a definition operand, a reference operand, a preceding instruction, and a succeeding instruction for each instruction in a translation unit.

The instruction number identifies each instruction. The instruction name represents a name of a calculation type (ADD, SUB, MULT, DIV, or the like). In the item of the definition operand, an identifier specifying a logical register which is used in the intermediate code 141 and which stores data of a calculation result is set. In the item of the reference operand, an identifier of at least one register which stores data to be referenced is set. In the item of the preceding instruction, an instruction number of a preceding instruction in the intermediate code 141 is set. In the item of the succeeding instruction, an instruction number of a succeeding instruction is set.

The instruction combination data 143 includes items of a combination number, an instruction number, and an SIMD instruction position for each instruction combination determined to be converted into SIMD. The combination number identifies each instruction combination. In the item of the instruction number, instruction numbers of combined instructions are listed. The number of listed instruction numbers corresponds to a parallel degree of SIMD. By the item of the instruction number, the instruction data 142 and the instruction combination data 143 are associated with each other. In the item of the SIMD instruction position, information representing a position in the intermediate code 141 in which a generated SIMD instruction is embedded is set.

Figure 15:
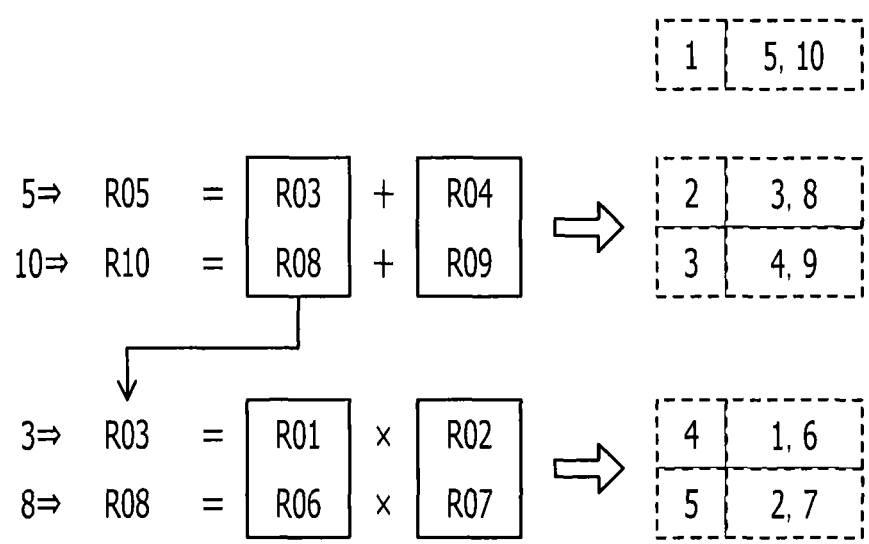
FIG. 15 is a diagram illustrating combinations of instructions.

FIG. 15 is a diagram illustrating combinations of instructions. When the first to twelfth instructions illustrated in FIG. 13 is read from the intermediate code 141, the analyzer 126 first determines that a combination of the fifth and tenth instructions is to be converted into SIMD. Then the analyzer 126 extracts a combination of reference operands R03 and R08 and a combination of reference operands R04 and R09 from the combination of the fifth and tenth instructions. The analyzer 126 determines that a combination of the third and eighth instructions is to be converted into SIMD in accordance with the combination of the reference operands R03 and R08, and also determines that a combination of the fourth and ninth instructions is to be converted into SIMD in accordance with the combination of the reference operands R04 and R09.

Furthermore, the analyzer 126 extracts a combination of reference operands R01 and R06 and a combination of reference operands R02 and R07 from the combination of the third and eighth instructions. The analyzer 126 determines that a combination of the first and sixth instructions is to be converted into SIMD in accordance with the combination of the reference operands R01 and R06, and determines that a combination of the second and seventh instructions is to be converted into SIMD in accordance with the combination of the reference operands R02 and R07.

Figure 16:
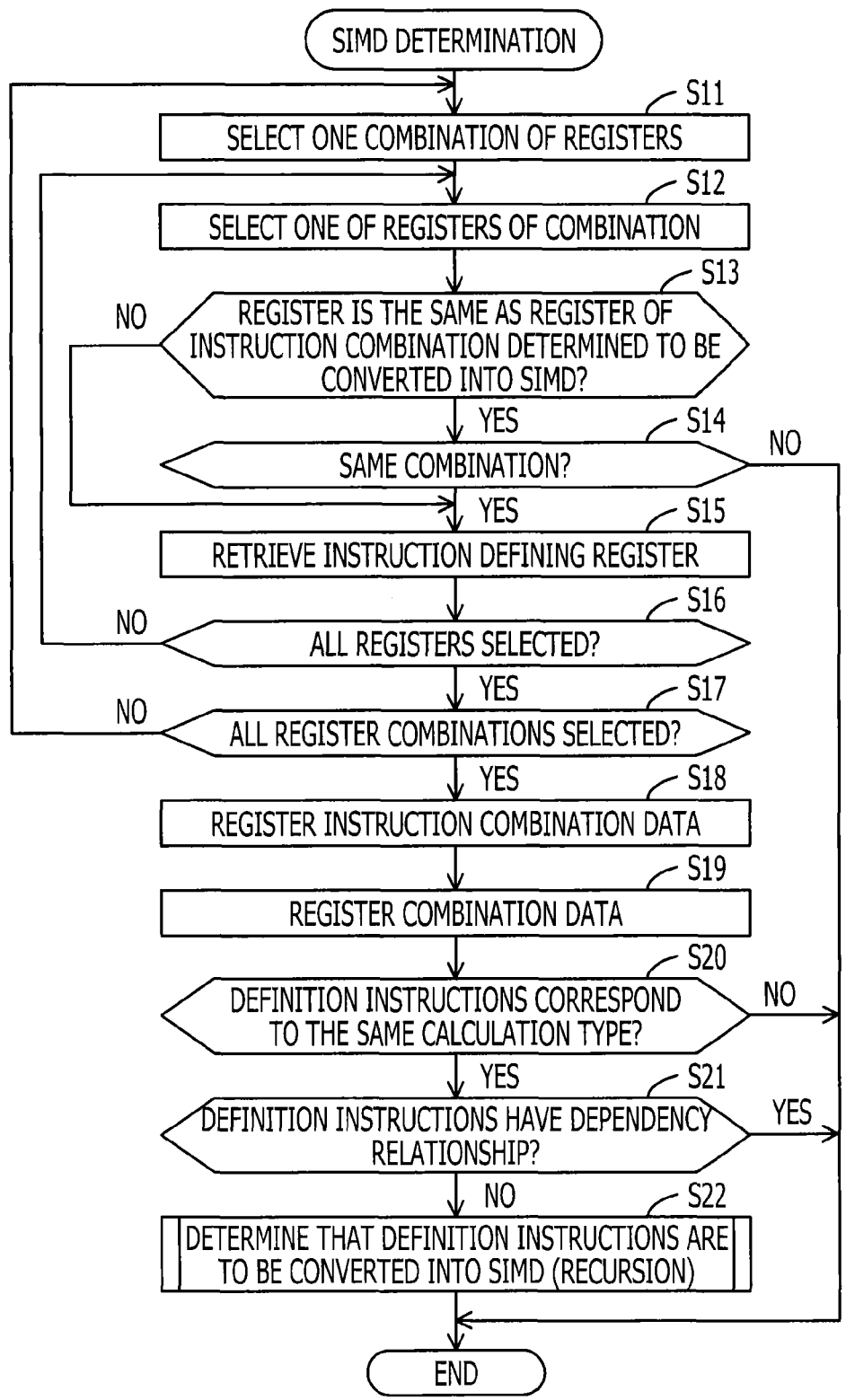
FIG. 16 is a flowchart illustrating a procedure of an SIMD determination process.

FIG. 16 is a flowchart illustrating a procedure of an SIMD determination process. The process represented by this flowchart is executed in Operation S3 described above.

(Operation S11) When a candidate of an instruction combination is selected, the analyzer 126 extracts one or more combinations of registers as combinations of reference operands. Then the analyzer 126 selects one of the extracted register combinations. (Operation S12) The analyzer 126 selects one of the registers included in the selected register combination.

(Operation S13) The analyzer 126 determines whether the selected register is the same as a register represented by one of reference operands of an instruction combination which has been determined to be converted into SIMD. When the determination is affirmative, the process proceeds to Operation S14, and otherwise the process proceeds to Operation S15. (Operation S14) The analyzer 126 determines whether a combination of the register selected in Operation S12 and the other register is the same as a combination of registers corresponding to the instruction combination which has been determined to be converted into SIMD. For example, the analyzer 126 determines whether the combination of the registers of the candidate of the instruction combination and the combination of the registers of the instruction combination which has been determined to be converted into SIMD are the same as each other and whether slots assigned to the registers of the candidate of the instruction combination and slots assigned to the registers of the instruction combination which has been determined to be converted into SIMD are the same as each other. When the determination is affirmative, the process proceeds to Operation S15. When the determination is negative, it is determined that the selected candidate of the instruction combination is not converted into SIMD, and the process is terminated.

(Operation S15) The analyzer 126 retrieves from the intermediate code 141 instructions (definition instructions) which includes the register selected in Operation S12 as a definition operand. (Operation S16) The analyzer 126 determines whether all the registers have been selected in Operation S12. When the determination is affirmative, the process proceeds to Operation S17 whereas when the determination is negative, the process proceeds to Operation S12. (Operation S17) The analyzer 126 determines whether all the combinations of registers have been selected in Operation S11. When the determination is affirmative, the process proceeds to Operation S18 whereas when the determination is negative, the process proceeds to Operation S11.

(Operation S18) The analyzer 126 determines that the selected candidate of the instruction combination is to be converted into SIMD and registers the instruction combination in the instruction combination data 143. (Operation S19) The analyzer 126 generates register combination data representing the combination of registers extracted in Operation S11 so that the register combination data is used in determinations performed on a succeeding candidate of an instruction combination in Operation S13 and Operation S14, and stores the register combination data in the RAM 102.

(Operation S20) The analyzer 126 determines whether the two or more definition instructions retrieved in Operation S15 correspond to the same calculation type. When the determination is affirmative, the process proceeds to Operation S21 whereas when the determination is negative, the process is terminated. (Operation S21) The analyzer 126 determines whether the retrieved definition instructions have the dependency relationship in accordance with an instruction dependency graph. When the determination is affirmative, the process is terminated whereas when the determination is negative, the process proceeds to Operation S22. (Operation S22) The analyzer 126 selects a combination of the retrieved two or more definition instructions as a candidate of an instruction combination to be converted into SIMD, and recursively performs the SIMD determination process illustrated in FIG. 16.

According to the terminal device 100 of the second embodiment, an instruction combination which can be converted into SIMD is retrieved from the end to the beginning of an instruction queue, and a candidate of an instruction combination to be converted into SIMD next is retrieved using a combination of reference operands included in the instruction combination which has been determined to be converted into SIMD as a key. By this, an instruction combination which can suppress data transfer between SIMD registers can be retrieved, and execution efficiency of an object code generated by the compiler 120 is improved. Furthermore, such an instruction combination can be efficiently retrieved in the compiler 120.

Note that, as described above, the information process of the first embodiment is realized by causing the information processing apparatus 10 to execute programs, and the information process of the second embodiment is realized by causing the terminal device 100 to execute programs. The programs may be recorded in a computer-readable recording medium (such as the recording medium 23). Examples of the recording medium include a magnetic disk, an optical disc, a magneto-optical disc, and a semiconductor memory. Examples of the magnetic disk include an FD and an HDD. Examples of the optical disc include a CD, a CD-R (Recordable)/RW (Rewritable), a DVD, and a DVD-R/RW.

When the programs are to be distributed, a portable recording medium which records the programs are supplied, for example. Furthermore, the programs may be stored in a storage device of another computer and the programs may be distributed through a network. The computer stores the programs recorded in the portable recording medium or the programs received from another computer in a storage device (such as the HDD 103) and executes the programs read from the storage device. Note that the programs read from the portable recording medium may be directly executed or the programs received from another compute through the network may be directly executed.

According to the foregoing embodiments, a code including an instruction for executing calculations of the same type in parallel on different data is generated so that execution efficient is improved.

All examples and conditional language recited herein are intended for pedagogical purposes to aid the reader in understanding the invention and the concepts contributed by the inventor to furthering the art, and are to be construed as being without limitation to such for example recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:
1. A code generation method, comprising:
   determining that a first specific instruction for executing parallel calculations of the same type, each calculation operating on a different piece of data, is generated by combining first and second instructions included in a first code, the first specific instruction using a first register to store the different pieces of data;

retrieving, from the first code by tracing the first code from the first and second instructions to a beginning, a third instruction for calculating data referenced by the first instruction and a fourth instruction for calculating data referenced by the second instruction;

selecting the third and fourth instructions as candidates of instructions to be combined with each other to generate a second specific instruction, which is different from the first specific instruction and is to be executed before the first specific instruction, the second specific instruction using a second register to store an execution result of the second specific instruction;

determining whether to combine the third and fourth instructions to generate the second specific instruction by determining whether data included in the second register is to be transferred to the first register when the first specific instruction is to be executed after execution of the second specific instruction; and determining a combination of the first and second instructions by scanning an instruction queue included in the first code from the end to the beginning of the instruction queue.

2. A non-transitory computer-readable recording medium having stored therein a program for causing a computer to execute a process comprising:

determining that a first specific instruction for executing parallel calculations of the same type, each calculation operating on a different piece of data, is generated by combining first and second instructions included in a first code, the first specific instruction using a first register to store the different pieces of data;

retrieving, from the first code by tracing the first code from the first and second instructions to a beginning, a third instruction for calculating data referenced by the first instruction and a fourth instruction for calculating data referenced by the second instruction;

selecting the third and fourth instructions as candidates of instructions to be combined with each other to generate a second specific instruction, which is different from the first specific instruction and is to be executed before the first specific instruction, the second specific instruction using a second register to store an execution result of the second specific instruction;

determining whether to combine the third and fourth instructions to generate the second specific instruction by determining whether data included in the second register is to be transferred to the first register when the first specific instruction is to be executed after execution of the second specific instruction; and determining a combination of the first and second instructions by scanning an instruction queue included in the first code from the end to the beginning of the instruction queue.

3. An information processing apparatus comprising:

a memory which stores a program; and a processor which executes, based on the program, a process including:

determining that a first specific instruction for executing parallel calculations of the same type, each calculation operating on a different piece of data, is generated by combining first and second instructions included in a first code, the first specific instruction using a first register to store the different pieces of data, retrieving, from the first code by tracing the first code from the first and second instructions to a beginning, a third instruction for calculating data referenced by the first instruction and a fourth instruction for calculating data referenced by the second instruction, selecting the third and fourth instructions as candidates of instructions to be combined with each other to generate a second specific instruction, which is different from the first specific instruction and is to be executed before the first specific instruction, the second specific instruction using a second register to store an execution result of the second specific instruction, determining whether to combine the third and fourth instructions to generate the second specific instruction by determining whether data included in the second register is to be transferred to the first register when the first specific instruction is to be executed after execution of the second specific instruction, and determining a combination of the first and second instructions by scanning an instruction queue included in the first code from the end to the beginning of the instruction queue.

* * * * *